(12) United States Patent
Wang et al.

(10) Patent No.: US 7,907,340 B2
(45) Date of Patent: Mar. 15, 2011

(54) INTEGRATED NARROW BANDPASS FILTER ARRAY AND A METHOD FOR FABRICATION THEREOF

(75) Inventors: Shaowei Wang, Shanghai (CN); Wei Lu, Shanghai (CN); Xiaoshuang Chen, Shanghai (CN); Ning Li, Shanghai (CN); Bo Zhang, Shanghai (CN); Zhifeng Li, Shanghai (CN); Pingping Chen, Shanghai (CN)

(73) Assignee: Shanghai Institute of Technical Physics, Chinese Academy of Sciences, Shanghai (CN)

( * ) Notice: Subject to any disclaimer, the term of this patent is extended or adjusted under 35 U.S.C. 154(b) by 0 days.

(21) Appl. No.: 11/924,640

(22) Filed: Oct. 26, 2007

(65) Prior Publication Data
US 2008/0042782 A1 Feb. 21, 2008

Related U.S. Application Data

(63) Continuation of application No. PCT/CN2006/000776, filed on Apr. 24, 2006.

(30) Foreign Application Priority Data

Apr. 27, 2005 (CN) .......................... 2005 1 0025460

(51) Int. Cl.
*G02B 1/10* (2006.01)

(52) U.S. Cl. ......... 359/587; 359/584; 359/588; 359/589
(58) Field of Classification Search .................. 359/584, 359/587, 588, 589
See application file for complete search history.

(56) References Cited

U.S. PATENT DOCUMENTS

| 6,031,653 | A  | * | 2/2000 | Wang | 359/247 |
| 6,631,033 | B1 | * | 10/2003 | Lewis | 359/584 |
| 2003/0048537 | A1 | * | 3/2003 | Hulse | 359/590 |
| 2006/0109398 | A1 | * | 5/2006 | Mi | 349/96 |

* cited by examiner

*Primary Examiner* — Joshua L Pritchett
(74) *Attorney, Agent, or Firm* — Matthias Scholl P.C.; Matthias Scholl

(57) ABSTRACT

Taught herein is an integragted narrow bandpass filter array and a method of its fabrication. The filter array is a Fabry-Perot type of filter array, wherein the pass band changes with the thickness of the spacer layer. The integrated filter array comprises a substrate, a lower mirror stack, a spacer array, and an upper mirror stack. The spacer array is an array of varied thicknesses formed using a combinatorial deposition technique. The spacer array is used to control the pass band of each mini-size narrow bandpass filter and realizes the integration of narrow bandpass filters with different pass bands on a single substrate. The merit of this technique lies in its fabrication efficiency and finished product rate which are much higher than for conventional methods. The filter array is completely matched with detector arrays and functional in most of the important optical ranges.

2 Claims, 5 Drawing Sheets

INTEGRATED NARROW BANDPASS FILTER ARRAY AND A METHOD FOR FABRICATION THEREOF

CROSS-REFERENCE TO RELATED APPLICATIONS

This application is a continuation of International PCT Patent Application No. PCT/CN2006/000776 with an international filing date of Apr. 24, 2006, designating the United States, now pending, and claims priority benefits to Chinese Patent Application No. 200510025460.0 filed on Apr. 27, 2005. The contents of the aforementioned specifications are incorporated herein by reference.

BACKGROUND OF THE INVENTION

1. Field of the Invention

The present invention relates generally to optical devices and components, and more specifically, it relates to filters, integrated filter arrays, and related devices.

2. Description of the Related Art

Multispectral acquisition (MSA) has been widely used in space research and other fields. Wavelength division techniques are most important parts thereof. Conventional wavelength division components include filters rotating in a wheel frame, gratings, prisms, etc. Such components occupy large space and have a large weight which increases the payload of aero crafts. Furthermore, they include mechanical moving parts, which are unreliable and likely lead to overall system failures.

Filter arrays, developed from the 1980s on, are microspace wavelength division components, which are made up of spectrally distinguishable detectors with detector arrays. This has largely simplified the wavelength division system, and improved the reliability, stability, optical efficiency and signal to noise ratio (SNR). Therefore, the wavelength division systems of new optical apparatuses tend to use such new structures to acquire spectral information. Furthermore, the application of filter arrays improves the integration and miniaturization of relevant sensor devices, and provides powerful support on the study of filter-type micro-spectrometers.

Although filter arrays have a huge application potential, no clear progress has been made for decades restricting their applications. There are two obstacles for the development of filter arrays, namely, micromation and integration. The most perspective integrated filters should be the filters with different spectral characters integrated on a single substrate, whose element size can be in the order of microns and which can be designed and fabricated to match the detector arrays.

There are two kinds of filter arrays integrated on a single substrate. The first kind is realized by fabricating filters conventionally one by one by while masking other areas of the substrate. (See [1] Cheng Shiping, Yan Yixun, Zhang Fengshan, et al., Development of three-channel short-wave IR spectrum distinguishable detector array, J. Infrared Millim. Waves, 13, 401 (1994) (in Chinese); [2] Cheng Shiping, Zhang Fengshan, Yan Yixun, Study on the Technology of Preparing Micro-infrared Filter Array by Masking and Lifting-Off Method, J. Infrared Millim. Waves 13, 109 (1994) (in Chinese)). This is a very complicated fabrication method. The product array rate is one half of the starting array rate when adding an additional filter to the array. For example, provided that the efficiency rate of each fabrication process is 90%, the finished array production efficiency rate is only $0.9^{32}$ (or about 3%) for fabrication of a 32 channel filter array. Such a low finished product rate leads to very high cost for fabricating integrated filter array by conventional optical thin film techniques, and largely restricts a higher rate of integration.

The second kind of filter arrays integrated on a single substrate is based on the Fabry-Perot interference principle, wherein a high-integration filter array is designed with a spacer layer having a variable thickness which corresponds to the filter's pass band. See, e.g., Chinese Pat. Appl. Publ. No. 200310108346.5.

Spacer arrays with different thicknesses can be realized by using the combinatorial etching technique. The filter array is formed by employing micrometer balls to connect two interference interfaces and control the final thicknesses of the spacer layers. There is merit in controlling the thickness of a spacer array by etching in that an array integrated with $2^n$ filters needs only two times of deposits and n times of etching. For example, only 5 times of etching for fabricating a 32 channel-filter array by using a combinatorial etching technique. The efficiency of this method is 6 times higher than that of conventional methods and the finished product rate is $0.9^7$ (or about 48%), i.e., 14 times higher than that of the conventional method assuming the same product rate for each process. With the increase of integration, the finished product rate will decrease rapidly with an exponential trend by conventional method, while only a little lower than 48% by combinatorial etching technique. The efficiency of this method is much higher than that of the conventional method which has a remarkable advantage on cost saving.

However, the fact that the etching process has been introduced into the fabrication procedure results in two problems. The first problem is the increase in the roughness of the spacer's surface which leads to lowering the property of the filter. The second one is that the control precision of etching does affect the control precision of the filter's passband. Furthermore, it is very hard to control the size of the micrometer balls accurately. Therefore, it is very hard to control the final thickness of spacer layer accurately which in turn leads to the difficulty of controlling the filter's passband accurately.

SUMMARY OF THE INVENTION

The aim of this invention is to overcome the roughness problem of the spacer layer and the relatively-low passband control precision problem arising during filter fabrication. In the embodiments and methods of this invention, we introduce a narrow bandpass filter array structure and its fabrication method utilizing a simple fabrication process having a high finished product rate.

In one embodiment of the invention, the narrow bandpass filter array comprises a substrate and
(a) a film structure represented by the following formula grown on the substrate: $(LH)_m xL(HL)_m$,
  wherein $(LH)_m$, $(HL)_m$ and xL represent the upper mirror stack, lower mirror stack and spacer layer, respectively; or
(b) a film structure represented by the following formula grown on the substrate: $(HL)_m xH(LH)_m$,
  wherein $(HL)_m$, $(LH)_m$ and xH represent the upper mirror stack, lower mirror stack and spacer layer, respectively.

In certain embodiment of the invention, the narrow bandpass filter array comprises a substrate and a film structure grown on the substrate, wherein H and L represent the high and low refractive index layers; m is the number of (HL) or (LH) stack; and $m \geq 2$.

In certain embodiment of the invention, the optical thickness (nd) of each layer is $\lambda_0/4$, wherein $\lambda_0$ is the design wavelength of the initial filter.

In certain embodiment of the invention, the above xL or xH spacer layer is the array having different thicknesses.

In certain embodiment of the invention, the thickness changes with x, and x is in the range of 1<x<3 or 3<x<5.1.

The method for fabricating narrow bandpass filter array is as described below.

According to the above filter structure, the lower mirror stack will be firstly deposited onto the substrate by using routine deposition methods, such as e-beam evaporation and reactive magnetron sputtering system. Then, the spacer array with different thicknesses is grown on the lower mirror stack by running the combinatorial deposition processes N times with different masks. During the combinatorial deposition processes, a series of masks are used to realize the function of selective deposition on different areas. The window's shape and size of the masks, corresponding to the shape and size of the spacer array and resultant filter array, are designed to match the detector array. The mask is used for filter sizes of centimeters or millimeters. Photolithography is used for smaller filter sizes. After depositing the upper mirror stack onto the spacer array, a filter array with a series of distinct pass bands is completed.

For Fabry-Perot type of filter, its passband is dominated by and linearly proportional to the thickness of the spacer layer for a constant refractive index. A series of spacer layers with different thicknesses are integrated on a single substrate by using the combinatorial deposition technique, and then a series of filters with different passbands are integrated on a single substrate easily. This technique is valid for the fabrication of narrow bandpass filter arrays in most of the important optical ranges.

The merits of the invention are as described below.

1. Very simple fabrication procedure. One only needs to design a film structure and complete the fabrication of integrated $2^n$ narrow bandpass filters array with n+2 times of deposits. The fabrication efficiency is very high compared with conventional methods.

2. No etching processes are employed to avoid the degradation of filter properties resulted from surface roughness by etching and problem of control precision.

3. The shape and size of the filter arrays can be designed to match with detectors and be composed of spectral-distinguishable detectors. This will remarkably simplify the structure of spectral apparatus and weighs in favor of its micromation and integration. This structure and technique is valid for most of the important optical ranges.

DETAILED DESCRIPTION OF THE INVENTION

With reference to the appended drawings, the best mode of the invention is described in the below-stated examples.

EXAMPLE 1

8×1 Integrated Narrow Bandpass Filter Array in the NIR Range

The film structure was $(LH)_m xL(HL)_m$ with design wavelength $\lambda_o$ of 777.4 nm, wherein L and H represent $SiO_2$ (n=1.47) and $Nb_2O_5$ (n=2.25) layers, respectively. n was the refractive index. m=7, where m was the number of (LH) pairs. x was in the range of 1.7-2.4 with the interval of 0.1. These 8 spacer layers having different thicknesses corresponded to 8 narrow bandpass filters with different passbands.

Detailed fabrication procedure is as described below.

Figure 1:
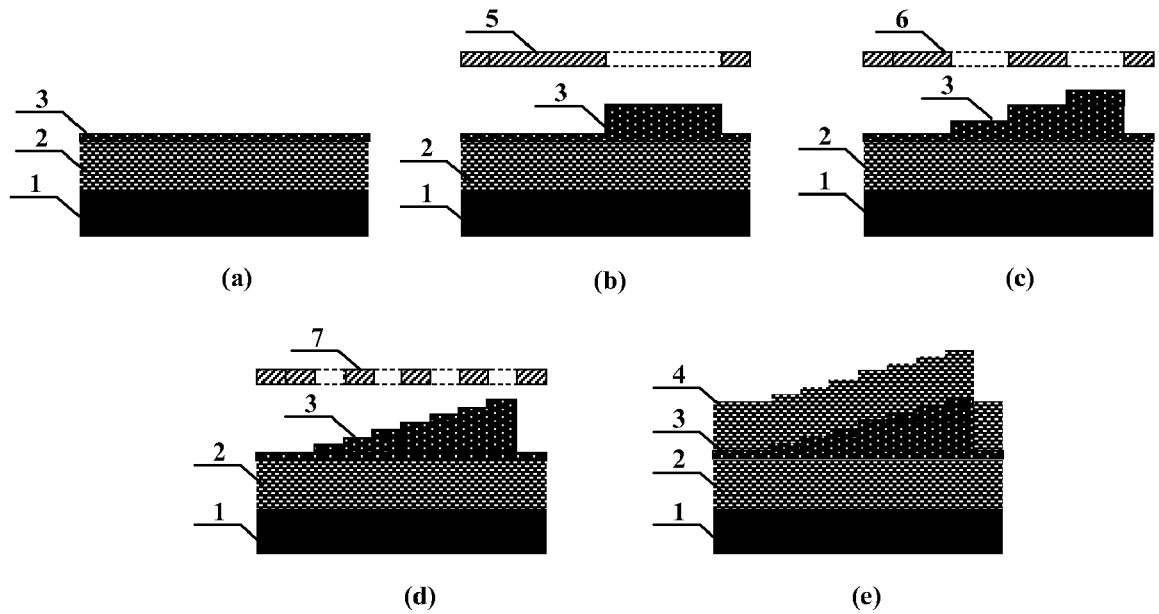
FIG. 1 is a schematic diagram of fabrication procedure by using the combinatorial deposition technique described in example 1.

With reference to FIG. 1, firstly, a lower mirror stack 2: $(LH)_m$ was deposited on glass, quartz or sappare substrate 1, where L and H represent $SiO_2$ and $Nb_2O_5$ layers, respectively. The number of (LH) pair was seven. At the same time, a spacer layer with thickness of 1.7 L was also deposited, as shown in FIG. 1(a).

Then, the combinatorial deposition process was carried out three times for different areas with mask 5 (see FIG. 1(b)), mask 6 (see FIG. 1(c)) and mask 7 (see FIG. 1(d)), respectively. The deposition thicknesses at each time were 0.4 L, 0.2 L and 0.1 L, respectively. This formed the spacer array 3 with same thickness difference (0.1 L). The corresponding thicknesses of each spacer element are shown in Table 1.

Finally, the upper mirror stack 4: $(HL)_7$ was deposited on the spacer array 3 as shown in FIG. 1(e).

Figure 2:
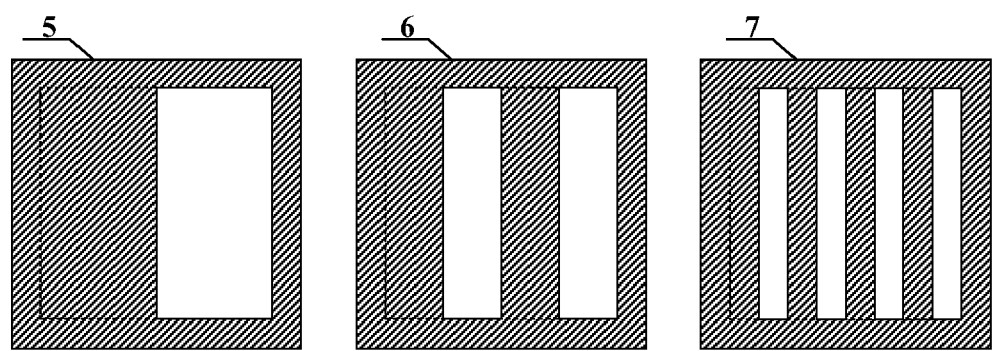
FIG. 2 shows schematic diagrams of the masks used in the combinatorial depositions as described in example 1.

The plane formed of masks 5, 6 and 7 is shown in FIG. 2.

Figure 3:
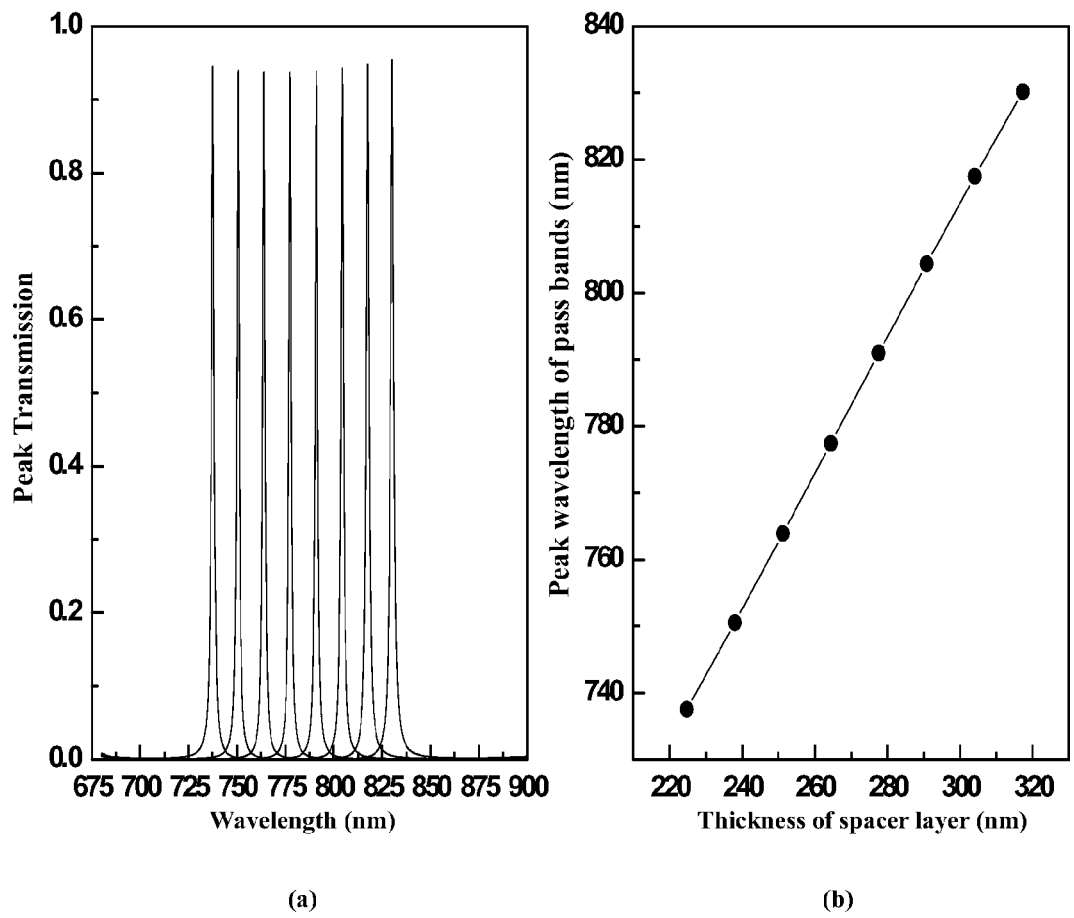
FIG. 3(a) shows theoretical transmission spectra of 8×1 integrated narrow bandpass filter array in the Vis-NIR range of example 1.
FIG. 3(b) illustrates change of the passbands as the thickness of spacer layer xL. x changes from 1.7 to 2.4 at an interval of 0.1.

The number of spacer elements exponentially increases with the increase of combinatorial deposition times. It is $2^n$. The number of spacer elements in this example is $2^3$, i.e. 8, and only three combinatorial deposits are needed. Similarly, only seven combinatorial deposits are needed for $2^7$, i.e., 128 elements. The efficiency is very high. If the deposition thickness of each deposition is the half of the former one, the thickness of the resultant spacer array is linearly changed and the corresponding pass bands will distribute in the same interval as shown in FIG. 3. The calculated transmission spectra and the change of pass bands with the thickness of spacer layer (xL) are shown in FIGS. 3 (a) and (b), respectively. FIG. 3(a) shows that the pass band of the narrow bandpass filter changes with the thicknesses of spacer layer. FIG. 3(b) shows that the pass band of the narrow bandpass filter is proportional to the thicknesses of spacer layer. Therefore, one can control the pass band of the filter by using the combinatorial deposition technique to obtain spacers with different thicknesses in different areas.

Similarly, one only need to rotate the masks (see FIG. 2) used in the combinatorial deposition procedure by 90 degrees, and in turn run a similar combinatorial deposition procedure to form a two-dimensional (2D) array.

Figure 4:
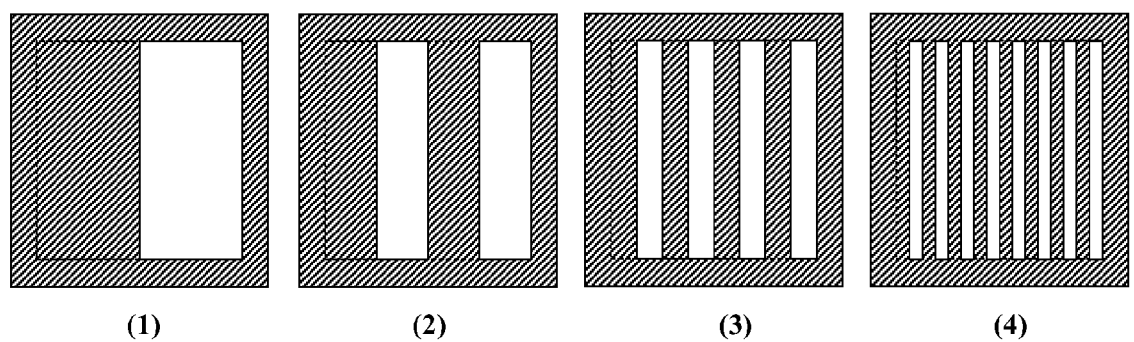
FIG. 4 shows schematic diagrams of the masks used in the four combinatorial depositions described in example 2.

The design of the masks is relatively simple:

Confirm the whole area of the filter array firstly. The first mask will divide the area into two halves. One half is used as the deposition window and the other one is protected. The second mask will divide the above two areas into two smaller areas again. Half of them are used as the deposition windows which are selected obeying the first mask. This is to say that, if the first mask uses the right half as the deposition window, then the following masks will also use the right half as the deposition windows, as shown in FIGS. 2 and 4. The design of other masks obeys the same rule. Therefore at most n masks are needed for fabricating an array integrating $2^n$ filters. The shape and size of the filter elements and their interval can be designed according to need.

As can be seen from the above fabrication procedure, the combinatorial deposition technique is very simple and has a high efficiency. Only one film structure needs to be design and the fabrication of integrated $2^n$ narrow bandpass filters array can be accomplished with n+2 times of deposits. The integration can be very high. Compared with conventional methods, both the efficiency and finished product rate of the combinatorial deposition technique are very high. Its efficiency and finished product rate are $$\frac{2^n}{n+2}$$

and $p^{n+2-2^n}$ times of conventional methods, respectively, wherein p is the product rate of each deposit. The higher integration, the more advantage of the technique over conventional methods. For example, the efficiency and finished product rate are 1.6 and $p^{-3}$ times of conventional methods, respectively, for fabricating a 8 channels ($2^3$) integrated filter array. They increase to 25.6 and $p^{-246}$ times of conventional methods for fabricating a 256 channel ($2^8$) integrated filter array, respectively. The efficiency and finished product rate are much higher than those of conventional methods. Additionally, there is no etching process involved in the fabrication process. This avoids the degradation of filter resulting from the change in the interface roughness. The thicknesses of spacer and the whole films are controlled by the deposition system. Therefore, the thickness of spacer layer, corresponding to the pass band, can be controlled well if the control precision of the deposition system only is high enough. This technique can be applied in most of the important optical ranges.

EXAMPLE 2

16×1 Integrated Narrow Bandpass Filter Array in the MIR Range

Figure 5:
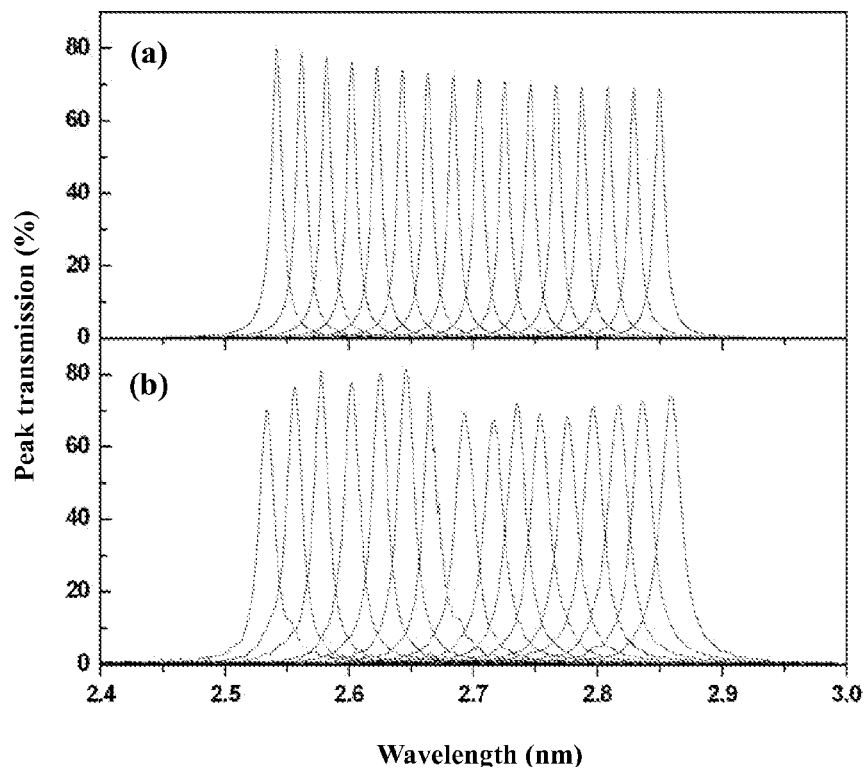
FIG. 5(a) shows theoretical transmission spectra of 16×1 integrated narrow bandpass filter array in the MIR range of example 2, wherein x is in the range of 3.40-4.00 with interval of 0.04.
FIG. 5(b) shows experimental transmission spectra of 16×1 integrated narrow bandpass filter array in the MIR range of example 2, wherein x is in the range of 3.40-4.00 with interval of 0.04.

The film structure was $(LH)_m xL(HL)_m$ with design wavelength $\lambda_0$ of 2.85 μm, wherein L and H represent $SiO_2$ (n=1.75) and Ge (n=4.05) layers, respectively. m=5. The substrate is Si or Ge. x is in the range of 3.40-4.00 with interval of 0.04. 16×1 integrated narrow bandpass filter array was obtained by using four consecutive combinatorial deposition procedures described in example 1 with the masks shown in FIG. 4. The theoretical transmission spectra of these filters with different thickness of spacer layer are shown in FIG. 5(a). The experimental results are shown in FIG. 5(b). The parameters of all the channels are listed in Table 2. The pass bands of each filter element were distributed in the range of 2.5334-2.8592 μm. Their full-width-at-half-maximum (FWHM) were between 14.2 nm and 20.2 nm. The relative FWHM ($\delta\lambda/\lambda$) were in the range of 0.55%-0.72%. The peak transmission of each channel was between 67.37% and 81.70%.

EXAMPLE 3

8×4 Integrated Narrow Bandpass Filter Array in the NIR Range

Figure 6:
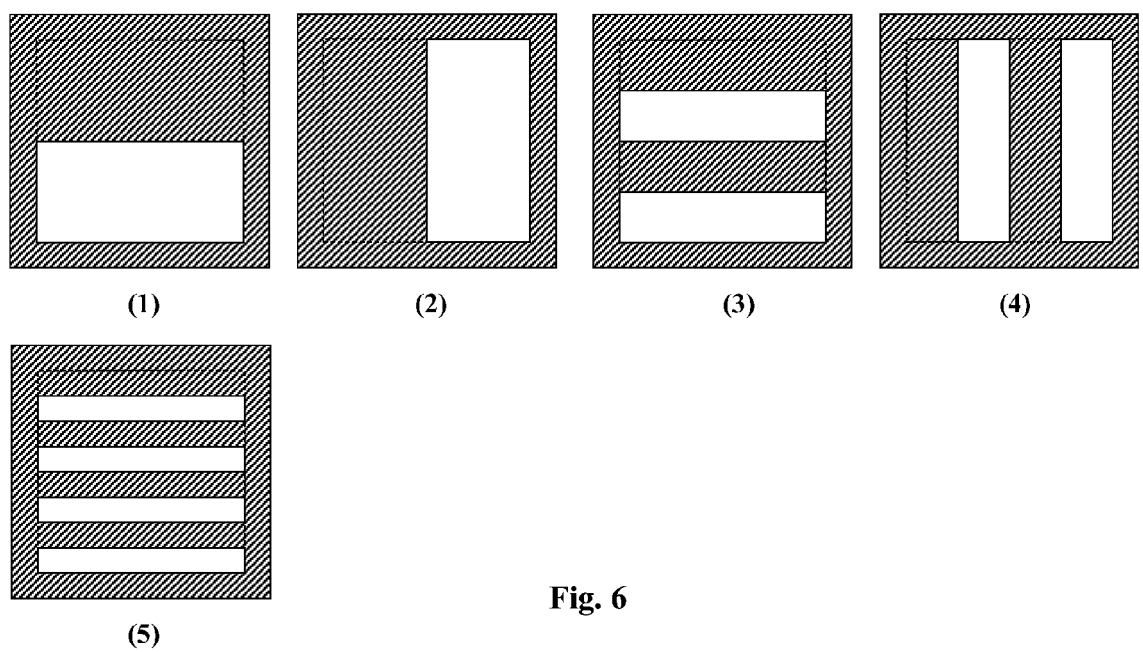
FIG. 6 shows schematic diagrams of the masks used in the five combinatorial depositions described in example 3.
Figure 7:
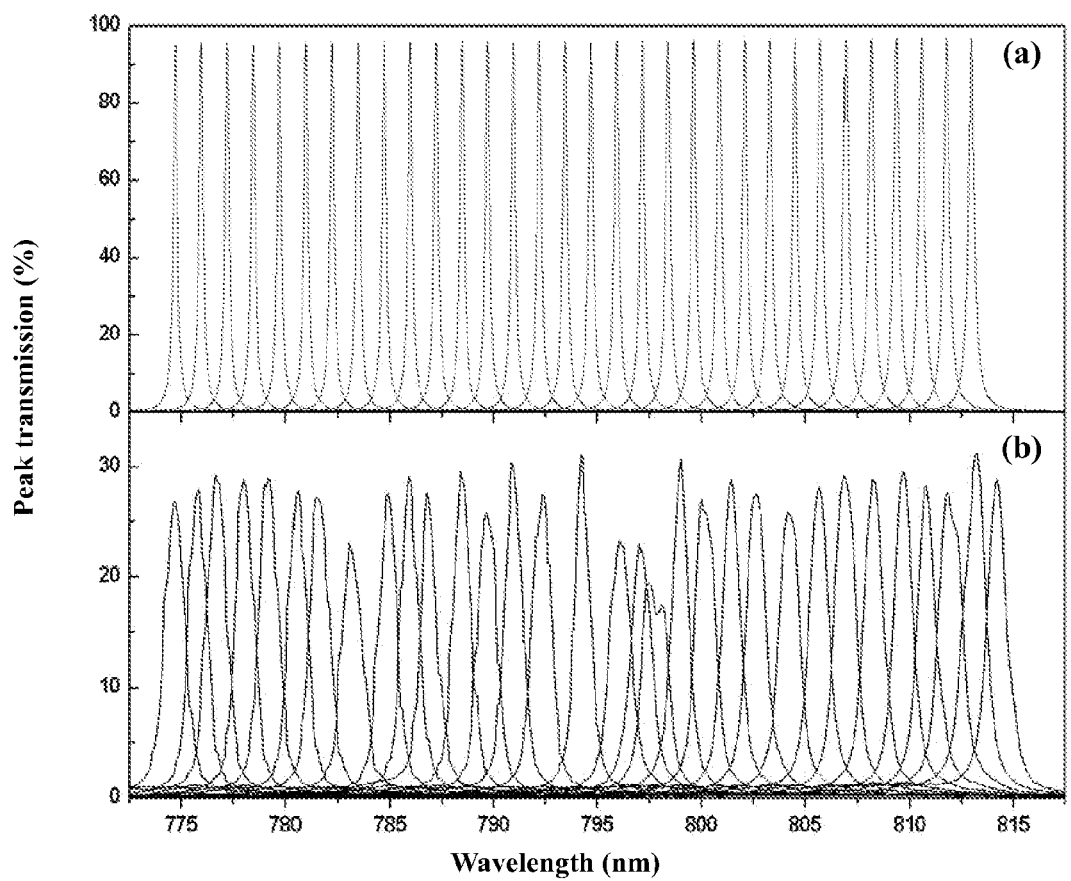
FIG. 7(a) shows theoretical transmission spectra of 8×4 integrated narrow bandpass filter array in the NIR range of example 3, wherein x is in the range of 3.970-4.404 with interval of 0.014.
FIG. 7(b) shows experimental transmission spectra of 8×4 integrated narrow bandpass filter array in the NIR range of example 3, wherein x is in the range of 3.970-4.404 with interval of 0.014.

The film structure was of the formula $(LH)_m xL(HL)_m$ with a design wavelength $\lambda_0$ of 777.4 nm, wherein L and H represent $SiO_2$ (n=1.48) and $Ta_2O_5$ (n=2.11) layers, respectively. m=10. The substrate was glass, quartz or sappare. x was in the range of 3.970-4.404 with interval of 0.014. 32 spacers of different thickness corresponded to 32 narrow bandpass filters with different pass bands. They were obtained by using five consecutive combinatorial deposition procedures as described in example 1 with the masks as shown in FIG. 6. The theoretical transmission spectra of these 32 filters with different thickness of spacer layer are shown in FIG. 7(a). The experimental results are shown in FIG. 7(b). The parameters of all the channels are listed in table 3. The pass bands of each filter element were distributed in the range of 774.7-814.2 nm.

The FWHM were between 0.79 nm and 1.44 nm. The relative FWHM ($\delta\lambda/\lambda$) were in the range of 0.10%-0.18%. The peak transmission of each channel was between 21.2% and 32.4%.

EXAMPLE 4

16×8 Integrated Narrow Bandpass Filter Array in the NIR Range

Figure 8:
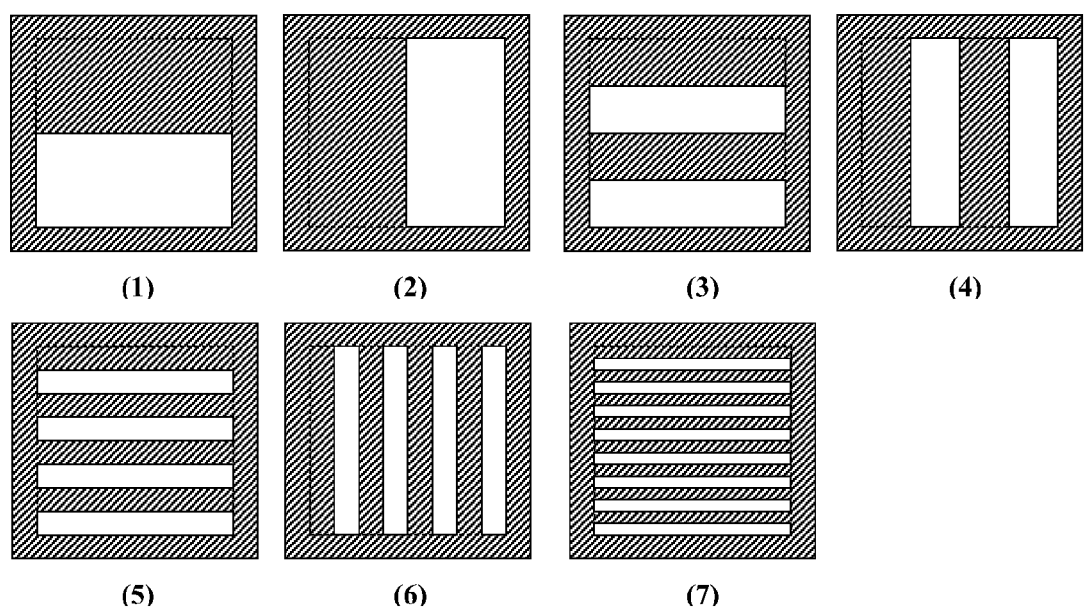
FIG. 8 shows schematic diagrams of the masks used in seven combinatorial depositions described in example 4.
Figure 9:
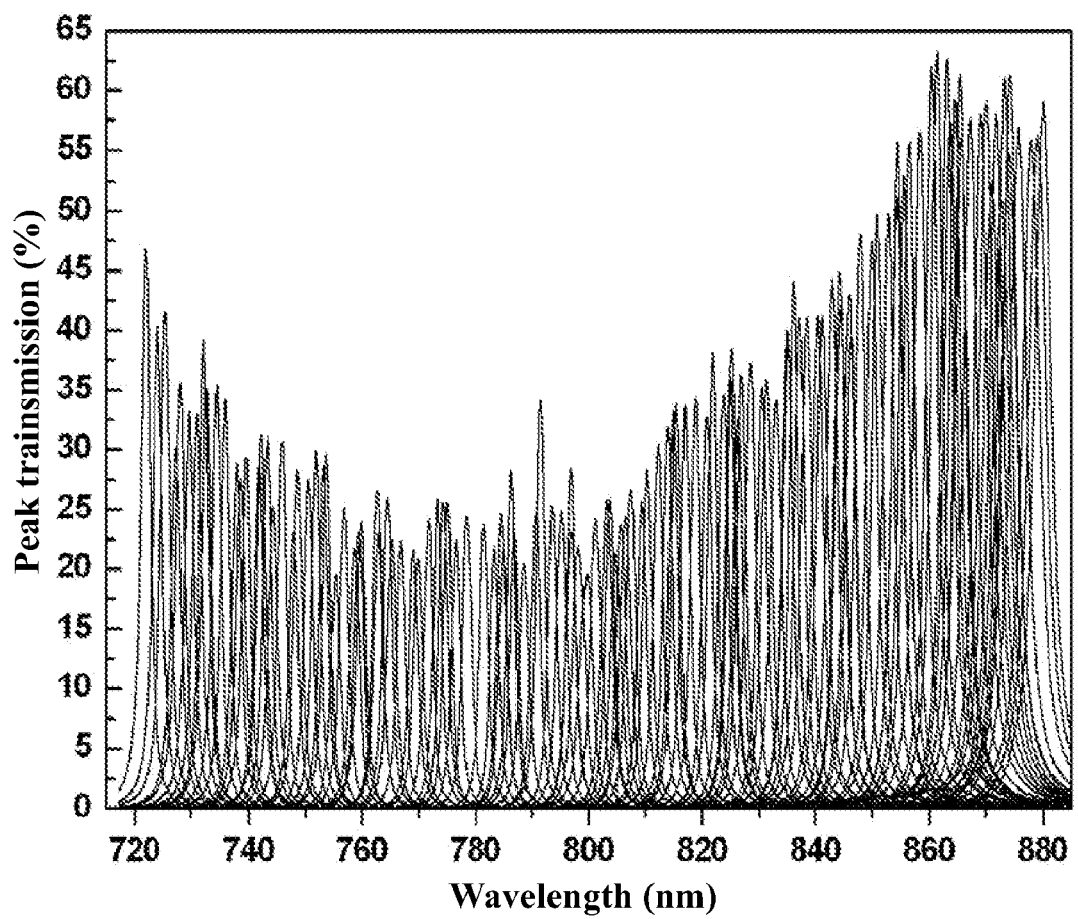
FIG. 9 shows experimental transmission spectra of 16×8 integrated narrow bandpass filter array in the NIR range of example 4, wherein x is in the range of 3.42-5.07 with interval of 0.013.
Figure 10:
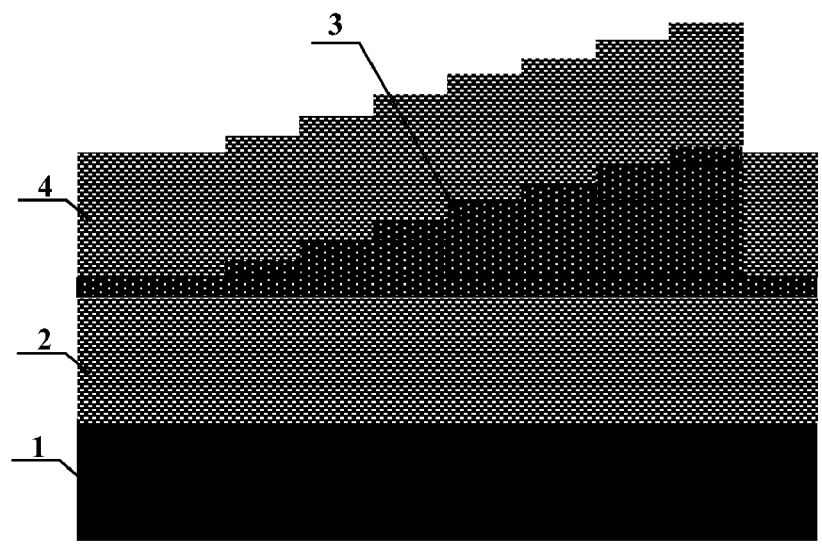
FIG. 10 shows a schematic diagram of an integrated narrow bandpass filter array according to one embodiment of the invention.

The film structure was of the formula $(LH)_m xL(HL)_m$ with design wavelength $\lambda_0$ of 777.4 nm, wherein L and H represent $SiO_2$ (n=1.47) and $Nb_2O_5$ (n=2.25) layers, respectively. m=7. The substrate was glass, quartz or sappare. x was in the range of 3.42-5.07 with interval of 0.013. 128 spacers in different thickness corresponded to 128 narrow bandpass filters with different pass bands. They were obtained by using seven consecutive combinatorial deposition procedures described in example 1 with the masks as shown in FIG. 8. The experimental transmission spectra of these 128 filters with different thickness of spacer layer are shown in FIG. 9. The pass bands of each filter element were distributed in the range of 722.0-880.0 nm. The average interval between two channels was 1.2 nm. The FWHM were between 1.72 nm and 3.84 nm. The relative FWHM ($\delta\lambda/\lambda$) was in the range of 0.22%-0.44%. The peak transmission of each channel was between 21% and 65%, with more than 65% of them being larger than 30%.

TABLE 1

| | Filter element | | | | | | | |
|---|---|---|---|---|---|---|---|---|
| | 1 | 2 | 3 | 4 | 5 | 6 | 7 | 8 |
| Optical thickness of spacer layer (L) | 0 | 0.1 | 0.2 | 0.3 | 0.4 | 0.5 | 0.6 | 0.7 |

TABLE 2

| Channel number | Optical thickness of spacer layer (L) | Peak wavelength of pass bands (μm) | Peak transmission (%) | Full Width at Half Maximum (nm) | Relative Full Width at Half Maximum (%) |
|---|---|---|---|---|---|
| 1 | 3.40 | 2.5334 | 71.00 | 14.8 | 0.58 |
| 2 | 3.44 | 2.5562 | 76.39 | 15.2 | 0.59 |
| 3 | 3.48 | 2.5776 | 80.90 | 14.2 | 0.55 |
| 4 | 3.52 | 2.6020 | 77.59 | 15.6 | 0.60 |
| 5 | 3.56 | 2.6254 | 80.20 | 15.4 | 0.59 |
| 6 | 3.60 | 2.6460 | 81.70 | 16.4 | 0.62 |
| 7 | 3.64 | 2.6646 | 75.80 | 15.0 | 0.56 |
| 8 | 3.68 | 2.6930 | 69.70 | 19.0 | 0.70 |
| 9 | 3.72 | 2.7166 | 67.37 | 18.2 | 0.67 |
| 10 | 3.76 | 2.7356 | 71.95 | 19.0 | 0.69 |
| 11 | 3.80 | 2.7539 | 69.16 | 18.8 | 0.68 |
| 12 | 3.84 | 2.7758 | 68.46 | 19.0 | 0.68 |
| 13 | 3.88 | 2.7964 | 71.37 | 19.2 | 0.69 |
| 14 | 3.92 | 2.8166 | 71.58 | 20.2 | 0.72 |
| 15 | 3.96 | 2.8360 | 72.85 | 19.4 | 0.68 |
| 16 | 4.00 | 2.8592 | 74.55 | 19.6 | 0.69 |

TABLE 3

| Channel number | Optical thickness of spacer layer (L) | Peak wavelength of pass bands (μm) | Peak transmission (%) | Full Width at Half Maximum (nm) | Relative Full Width at Half Maximum (%) |
|---|---|---|---|---|---|
| 1 | 3.970 | 774.69 | 28.9 | 1.08 | 0.14 |
| 2 | 3.984 | 775.8 | 29.8 | 0.98 | 0.13 |
| 3 | 3.998 | 776.72 | 31.4 | 1.04 | 0.13 |
| 4 | 4.012 | 778.04 | 31.4 | 0.96 | 0.12 |
| 5 | 4.026 | 779.2 | 31.9 | 1.00 | 0.13 |
| 6 | 4.040 | 780.58 | 29.3 | 0.97 | 0.12 |
| 7 | 4.054 | 781.61 | 30.0 | 1.02 | 0.13 |
| 8 | 4.068 | 783.18 | 24.3 | 1.12 | 0.14 |
| 9 | 4.082 | 784.92 | 28.9 | 0.93 | 0.12 |
| 10 | 4.096 | 785.94 | 30.1 | 0.91 | 0.12 |
| 11 | 4.110 | 786.86 | 28.2 | 0.82 | 0.10 |
| 12 | 4.124 | 788.48 | 30.5 | 0.94 | 0.12 |
| 13 | 4.138 | 789.72 | 28.2 | 1.00 | 0.13 |
| 14 | 4.152 | 790.97 | 31.4 | 0.90 | 0.11 |
| 15 | 4.166 | 792.33 | 29.5 | 1.00 | 0.13 |
| 16 | 4.180 | 794.27 | 31.0 | 0.79 | 0.10 |
| 17 | 4.194 | 796.11 | 25.0 | 1.10 | 0.14 |
| 18 | 4.208 | 797.1 | 24.0 | 1.07 | 0.13 |
| 19 | 4.222 | 797.74 | 21.2 | 1.44 | 0.18 |
| 20 | 4.236 | 798.99 | 31.0 | 0.85 | 0.11 |
| 21 | 4.250 | 800.17 | 29.4 | 1.05 | 0.13 |
| 22 | 4.264 | 801.44 | 29.9 | 0.94 | 0.12 |
| 23 | 4.278 | 802.64 | 29.9 | 1.03 | 0.13 |
| 24 | 4.292 | 804.26 | 28.3 | 1.05 | 0.13 |
| 25 | 4.306 | 805.68 | 29.9 | 1.00 | 0.12 |
| 26 | 4.320 | 806.92 | 31.6 | 1.05 | 0.13 |
| 27 | 4.334 | 808.27 | 30.5 | 1.02 | 0.13 |
| 28 | 4.348 | 809.7 | 31.2 | 0.96 | 0.12 |
| 29 | 4.362 | 810.81 | 28.9 | 0.95 | 0.12 |
| 30 | 4.376 | 811.95 | 29.8 | 1.25 | 0.15 |
| 31 | 4.390 | 813.16 | 32.4 | 1.12 | 0.14 |
| 32 | 4.404 | 814.21 | 30.1 | 1.05 | 0.13 |

What is claimed is:

1. A filter array comprising a plurality of narrow bandpass filters and integrated on a single substrate (1), each said narrow bandpass filter independently comprising a material having a structure of formula $(LH)_m x L (HL)_m$, wherein
$(LH)_m$ represents a lower mirror stack;
$(HL)_m$ represents an upper mirror stack;
xL represents a spacer layer;
H is a high refractive index layer;
L is a low refractive index layer;
m is the number of high and low refractive index layer pairs,
$m \geq 2$;
the optical thickness (nd) of said high refractive index layer is $\lambda_0/4$;
the optical thickness (nd) of said low refractive index layer is $\lambda_0/4$;
$\lambda_0$ is the design wavelength of the initial filter structure; and
x represents a thickness coefficient, said thickness coefficient being the thickness of the spacer layer (i) divided by the thickness of said high refractive index layer, or (ii) divided by the thickness of said low refractive index layer;
wherein each said lower mirror stack is directly deposited on and directly contacts said single substrate;
wherein spacer layers of two adjacent narrow band pass filters directly contact one another; wherein lower mirror stacks of two adjacent narrow band pass filters directly contact one another; and wherein upper stacks of two adjacent narrow band pass filters directly contact one another; and
wherein spacer layers of two adjacent narrow band pass filters have different thickness with respect to one another; wherein lower mirror stacks of two adjacent narrow band pass filters have the same thickness with respect to one another; and wherein upper stacks of two adjacent narrow band pass filters have the same thickness with respect to one another.

2. A filter array comprising a plurality of narrow bandpass filters integrated on a single substrate (1), each said narrow bandpass filter independently comprising a material having a structure of formula $(HL)_m x H (LH)_m$, wherein
$(HL)_m$ represents a lower mirror stack;
$(LH)_m$ represents an upper mirror stack;
xH represents a spacer layer;
H is a high refractive index layer;
L is a low refractive index layer;
m is the number of high and low refractive index layer pairs,
$m \geq 2$;
the optical thickness (nd) of said high refractive index layer is $\lambda_0/4$;
the optical thickness (nd) of said low refractive index layer is $\lambda_0/4$;
$\lambda_0$ is the design wavelength of the initial filter structure; and
x represents a thickness coefficient, said thickness coefficient being the thickness of the spacer layer (i) divided by the thickness of said high refractive index layer, or (ii) divided by the thickness of said low refractive index layer,
wherein each said lower mirror stack is directly deposited on and directly contacts said single substrate;
wherein spacer layers of two adjacent narrow band pass filters directly contact one another; wherein lower mirror stacks of two adjacent narrow band pass filters directly contact one another; and wherein upper stacks of two adjacent narrow band pass filters directly contact one another; and wherein spacer layers of two adjacent narrow band pass filters have different thickness with respect to one another; wherein lower mirror stacks of two adjacent narrow band pass filters have the same thickness with respect to one another; and wherein upper stacks of two adjacent narrow band pass filters have the same thickness with respect to one another.

* * * * *